United States Patent [19]

Martin

[11] Patent Number: 5,668,639
[45] Date of Patent: Sep. 16, 1997

[54] METHOD FOR VIDEO EDITING

[75] Inventor: Jose N. Martin, Madrid, Spain

[73] Assignee: Comunicacion Integral, Madrid, Spain

[21] Appl. No.: 407,814

[22] Filed: Mar. 21, 1995

[51] Int. Cl.$^6$ .................... H04N 5/76; G11B 27/02
[52] U.S. Cl. ................... 380/52; 360/13; 386/1
[58] Field of Search .................. 358/335, 342, 358/310, 311; 360/13, 14.1, 15; 348/578, 586, 588

[56] References Cited

U.S. PATENT DOCUMENTS

| | | |
|---|---|---|
| 4,357,624 | 11/1982 | Greenberg . |
| 4,641,255 | 2/1987 | Hohmann . |
| 4,713,695 | 12/1987 | Macheboeuf . |
| 4,750,050 | 6/1988 | Belmares-Sarabia et al. . |
| 4,758,892 | 7/1988 | Bloomfield . |
| 4,851,912 | 7/1989 | Jackson et al. . |
| 5,008,755 | 4/1991 | Brain . |
| 5,010,907 | 4/1991 | Henson et al. . |
| 5,051,835 | 9/1991 | Bruehl et al. . |
| 5,119,080 | 6/1992 | Kajimoto et al. . |
| 5,126,851 | 6/1992 | Yoshimura et al. ............... 358/335 |
| 5,194,952 | 3/1993 | Pelley . |
| 5,196,922 | 3/1993 | Yeomans . |
| 5,227,863 | 7/1993 | Bilbrey et al. . |
| 5,229,855 | 7/1993 | Siann . |
| 5,233,438 | 8/1993 | Funahashi et al. . |
| 5,241,371 | 8/1993 | Fukushima et al. . |
| 5,247,300 | 9/1993 | Sohn . |
| 5,258,747 | 11/1993 | Oda et al. . |
| 5,258,843 | 11/1993 | Truong . |
| 5,301,016 | 4/1994 | Gehrmann . |
| 5,309,238 | 5/1994 | Bae . |
| 5,327,177 | 7/1994 | Des-Jardins et al. . |
| 5,347,622 | 9/1994 | Takemoto et al. . |
| 5,353,063 | 10/1994 | Yagisawa et al. . |
| 5,355,450 | 10/1994 | Garmon et al. . |
| 5,381,184 | 1/1995 | Gehrmann . |
| 5,469,224 | 11/1995 | Her ........................... 368/589 |
| 5,652,096 | 9/1995 | Ito ............................ 358/311 |

FOREIGN PATENT DOCUMENTS

| | | |
|---|---|---|
| 2 089 625 C | 6/1982 | United Kingdom . |
| 2 113 950 C | 8/1983 | United Kingdom . |
| 2 140 257 C | 11/1984 | United Kingdom . |
| 2 157 122 C | 10/1985 | United Kingdom . |

OTHER PUBLICATIONS

Alvy Ray Smith, *Painting Tutorial Notes*, Computer Graphics Lab, New York Institute of Technology, SIGGRAPH '79, Aug. 6–10, 1979, Chicago, Illinois.

Alvy Ray Smith, *Paint*Computer Graphics Lab, New York Institute of Technology, Technical Memo No. 7, Jul. 20, 1978.

Bruce A. Wallace, *Merging And Transformation Of Raster Images For Cartoon Animation*, Program of Computer Graphics, Cornell University, Computer Graphics, vol. 15, No. 3, Aug. 1981.

Edited By Henry Fuchs, *Computer Graphics*, A Quarterly Report of SIGGRAPH–ACM, SIGGRAPH/81, Conference of Preceedings, Aug. 3–7, 1981, Dallas, Texas, vol. 15, No. 3, Aug. 1981.

*Primary Examiner*—Thai Q. Tran
*Assistant Examiner*—Robert Chevalier
*Attorney, Agent, or Firm*—Watov & Kipnes, P.C.

[57] ABSTRACT

Video data is edited by forming a plurality of vertically oriented video clips for each frame of video data, with each clip being positioned in its associated stacks in a hierarchy from background to foreground at the relative time of occurrence of the associated frame; with the stacks being displayed on a video display, whereby a cursor is used to capture one or more successive video clips in a given stack, for moving the video clip(s) to another of the stacks, for rearranging the video clips amongst the stacks to achieve a desired effect. Audio data is also formed into a plurality of audio clips, each for positioning at an end of an associated stack of video clips, whereby the cursor is used for capturing and moving the audio clips amongst the stacks of video clips for obtaining a desired effect.

12 Claims, 7 Drawing Sheets

(4 of 11 Drawing(s) in color)

METHOD FOR VIDEO EDITING

FIELD OF THE INVENTION

The field of the present invention relates generally to methods for editing video data, and more specifically to methods for editing and moving portions of video and/or audio data of one frame to another frame, for stretching frames in time, multilayering frames, and so forth.

BACKGROUND OF THE INVENTION

Methods and apparatus are known in the art for overlaying video data of one frame of video onto another frame, for obtaining a desired effect. It is also known in the art to change the speed of occurrence of successive frames of video to obtain slow or fast motion effects. Also, prior systems provide methods and apparatus for dubbing sound onto frames of video, and for editing or changing the sound track of associated video. Such prior video/audio editing systems are very complicated, requiring highly specialized training for efficient use.

SUMMARY OF THE INVENTION

It is an object of the invention to provide an improved video editing system.

Another object of the invention is to provide a simplified but very versatile system for editing and rearranging video and audio data on a frame-by-frame basis.

Another object of the invention is to provide an improved method for editing and manipulating image sequences on multiple tracks of image and/or sound from film and/or video recording image data.

Another object of the invention is to provide an improved editing system for unlimited layering of image data from image sources such as successive frames of video data or successive frames of film.

Yet another object of the invention is to provide an improved image editing system that includes simultaneous views of various of the imaging editing tasks being performed, respectively.

Another object of the invention is to provide in an improved image editing system continuous image interpolation in time over successive image sequences from video and film image data.

Another object of the invention is to provide an improved image editing system to display in real time both editing functions and image data being processed, for permitting a user to immediately observe all aspects of the editing process, and to facilitate this process in a user friendly manner.

Another object of the invention is to provide an improved image editing system for editing image and associated sound sequences derived from multiple tracks of image and sound.

With these and other objects in mind, and in view of the problems in the prior art, the present invention provides means for selectively eliminating and/or moving portions of video and/or audio data of given frames of video data between the frames, in which the data for each frame is formed into a vertical stack of rectangularly shaped clips, for display on a video monitor, whereby a cursor or shuttle bar is used to capture one or more video clips of one frame and move the same to a desired new position in the same frame or to another frame. The clips in each stack are arranged in a hierarchy of layers from background to foreground, with the primary background being the uppermost layer in this example, for one embodiment of the invention. The audio, if any, of each frame is also provided as an audio clip at one end of the associated stack of video clips, whereby the system also provides for the cursor to capture audio clips for rearranging the positioning of the audio clips with successive stacks of video clips over time to obtain a desired effect. Also, means are provided for stretching or contracting in time desired ones of the video clips, to obtain a desired effect. Clips are also used to show on the display the particular editing functions being performed at any given time.

BRIEF DESCRIPTION OF THE DRAWINGS

The file of this patent contains at least one color photograph. Copies of this patent with color photographs will be provided by the Patent and Trademark Office upon request and payment of the necessary fee.

Various embodiments of the present invention are described and illustrated with reference to the drawings, in which like items are identified by the same reference designation, wherein.

DETAILED DESCRIPTION OF THE INVENTION

Figure 1A:
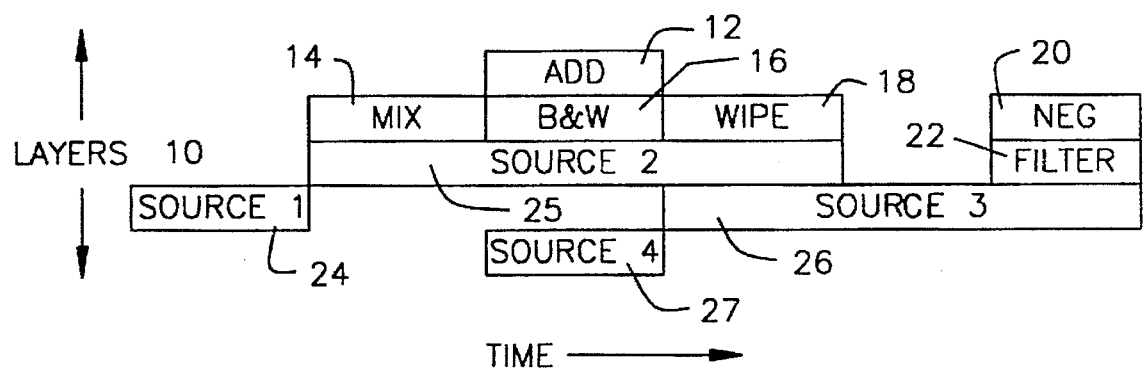
FIG. 1A is a block pictorial diagram of an example of a visual presentation for one embodiment of the invention for multilayering.

The present invention provides a system for substantially reducing the editing process required in prior systems for editing video and films. The system, as described in detail below, provides the functions of unlimited layering of editing procedures; grouping of editing procedures; multiple viewing of the editing procedure at one time; and continuous image interpolation in time over image sequences.

The present invention is a software based system that provides for the postproduction of images in Betacam, D1, D2, HDTV and film formats. The system takes advantage of Silicon Graphics platforms and utilizes the new enter and exit features of Galileo and Sirius videos. The user interface features a flexible new environment of production through open platforms. This characteristic makes possible the interaction of images and sounds from different sources (video and analogical and digital sound, 2-D and 3-D film images through computer graphics).

Central to the system is its ability to work in different formats, such as PAL or NTSC and resolution. In this way, digital imaging makes it possible to realize very complex operations without any loss in quality or deterioration of the original image. This feature allows for an infinite multiplicity of layers of images. Therefore, all decisions can be made in one editing session, such as deletions, re-editing, or even completely recreating image sequences. Additionally, the present invention has a virtual memory which displays the clips in real time once they have been computed.

This interface, based on windows, offers a "time space" work space [window] called a reel. In windows, the different clips (elements) can be edited to include images and sound, masks, 3-D animation and special effects. The horizontal dimension through the length of the reel adjusts the timing, while the vertical dimension of the reel arranges the position of the clips (elements).

For purposes of this description, a "clip" is defined as representing a sequence of images, sound chucks, image processing functions, and/or time transformations. In this example, a clip may have zero or more inputs, but always has two outputs. The outputs are the "image channel", and the "key channel", in addition to a set of associated parameters. At least three categories of clips are distinguished herein as follows:

Source clips: image and sound have no inputs, and therefore act as pure sources of information;

Effect clips: these define a particular process of their input and produce a unique output depending on the values of their set of parameters; and Group clips: these act as a single clip representing an arbitrary combination of any other type of clips, including other group clips. The Group clip also has a time transfer parameter to control frame delivery over time.

A "reel" is defined herein as an infinite workspace that holds:

horizontally: time positions at frame resolution; and
vertically: layers of clips.

The windows on a reel can be maximized or minimized as needed. The time scale can also be minimized or maximized in a frame at any time. Likewise, the reel can be arranged or moved at any time by way of a "bar shuttle" or cursor which contains the basic move functions.

Four Clips:

The system, in this example, includes at least four clips. The clips are those elements which can be contained in a time-space reel. An image clip is represented by a small monitor which can be used to either display or move the image in any temporal position in order to obtain a complete sequence.

A sound clip contains various audio digital options separated by decibels of $\frac{1}{25}$ per second so as to adjust the average speed of the video. The sound editing follows the same process as that of the image clips. Both the extension and compression of sound is attained by its duration, rather than by its frequency. The sound disks should be of the AIFF type and of any possible frequency that are Silicon Graphics compatible, including 44.1 kh and 48 kh which respectively are used in compact disks and digital DAT, in this example. They can be reproduced in either mono or stereo. The image clip has its own special effects, such as reverberation, echo, chorus and other types of filtering.

A third type of clip is for special effects (Fx). This type of clip can be superimposed by other clips to obtain very complex effects. The basic effects are origination of image, mixture, special transformation, mask and noise. The fourth type of clip is capable of reducing the space of the reel which contains very complex effects of image and sound. It can also be used to open interior spaces on the montage or arrange an entire block or area of the editing sequence. These clips also have the potential of self-editing through a virtual option which displays the clips in real time no matter how complex their interior sequences.

The monitor of the present invention has various independent advantages. For example, any part of the reel can be displayed by way of the "scroll" bar or the controls "shuttle". During a clip display, the clips proceed from bottom to top, generating the resulting sound and image effects. This makes possible the multiple layers of images, a feature which distinguishes the present invention from other prior systems.

The present invention provides almost all of the effects of analog or digital DVE. All the effects can be edited through Fx, a curve editor that can vary the length of time of any parameter of effects in real time. The effects function like clips that can be imported and achieved in the user library. The four effects are origination, mixture, special transformation, masks and noise. In the origination effect can be found the negative, solarization and color filter, among others. There are two mixture effects. Mix 2 mixes two images, while Mix 8 can mix any number of channels with one curve for each channel.

In the special transforation effect, the present invention offers Spacial Transformation (movement of image in space, definition of scale, arrangement and rotation in three axes) and Wipe (allows the creation of wipes in the form of smoke, fire, etc.). The effect of masks is the "color key" (shortening color) and "color difference" (sorting for different colors which adjust parameters).

The noise effect integrates "noise" (noise in the image); "granulate" (noise with an appearance of a classic movie); "stamp" (enlargement of the [aleator pixels] in the form of small frames); "displacement" (movement of the [pixels] in one aleatory direction); and, "plasm" (noise with an appearance of chunks of plasma).

The present invention has a graphics palette for touch-ups and for the creation of figures, masks, graphics, colors, rotoscopia, animation and other features which require resolution imaging.

As will be shown below, the present invention provides:

Non-linear editing

On-line editing

Composition in real time

Independent resolution

Originate images by field

Enter and exit video with VTR control

Non-concurrent editing

Interface
  Intuitive user interface
  Easy to learn and use
  Image and sound synchronization
  Totally configurable by user
Characteristics of Image Composition
  Infinite composition of multilayers
  Advanced module for the generation of masks
  Composition through Croma key
  Filter to eliminate borders in images
  Animation parameters in time
Special Effects
  Originate images
  Distortion of image
  Movement
  Generator and editor of sounds
  Rotoscopia, graphics palette and photographic touch-up
Sound
  Adjust for synchronization
  Volume and panoramic control
  Multichannel mix
  Reverberation, echo and stereo In one embodiment of the invention, the software is written in C++ program language. This language, which is oriented toward objects, makes possible the global interaction of different objects—of frames, clips or images, of sound and of effects—capable of rapid message transmission and self editing. Also, in one embodiment of the present invention, 64 bits are utilized, and independent resolution is provided.

Figure 1B:
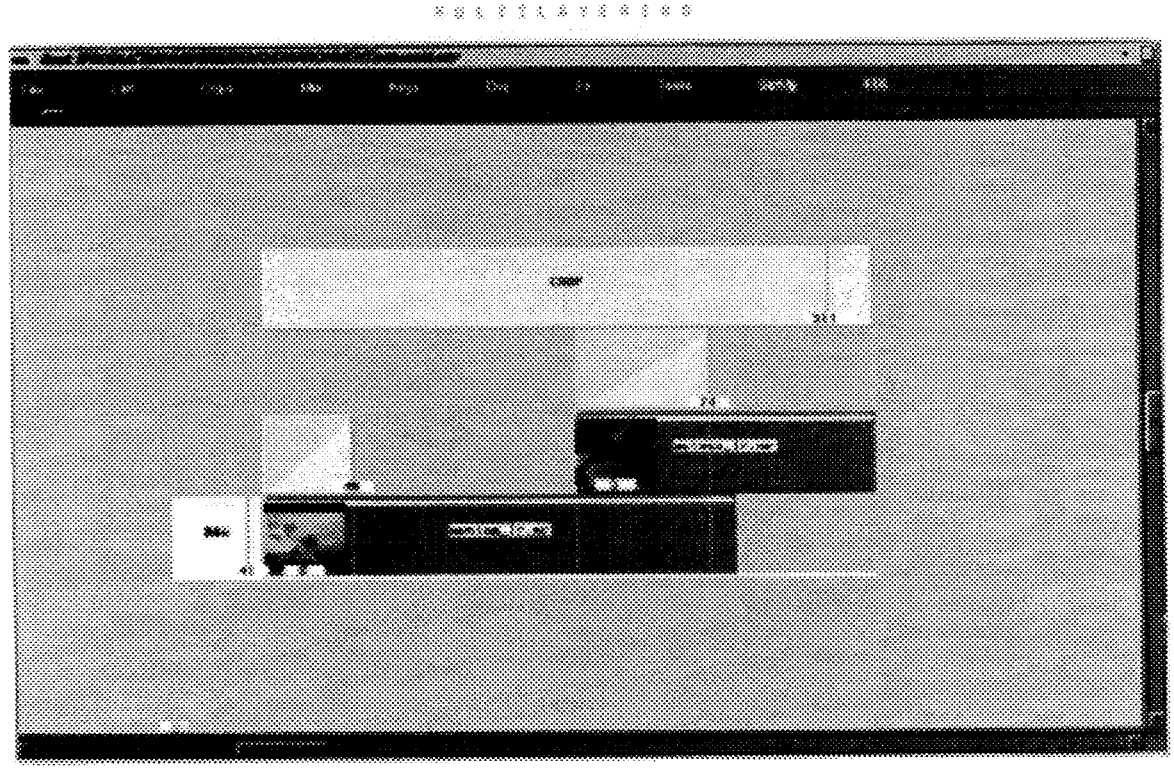
FIG. 1B is another block pictorial diagram of an example of a visual presentation for one embodiment of the invention for multilayering.

In FIG. 1A, a typical presentation to a user conducting multilayering through use of the present invention is shown. The presentation may be shown on a real time display as described below. Through use of multilayering, the present system provides the ability to perform image processing functions on an arbitrary complex series of images, defining a recursive description of a desired editing function required by a user at a particular time. The system permits frame or interframe time resolution, for controlling the editing process. As shown, for a given layer 10, editing sequences 12, 14, 16, 18, 20, and 22, and may be provided relative to four image and/or sound sources 24–27, arranged as shown in the form of clips. In this manner, the time positions of image information, in combination with the processing of desired effects upon the image or portions of an image can be visually mapped, all in a single operation as illustrated in the example of FIG. 1A. A further illustration is shown in FIG. 1B. Note that in FIG. 1B actual compressed presentations of the image being processed in a given layer are shown as clips 0 and 3. Note also the editing clip 311 for cropping, shown in a topmost layer, the video blanks shown as clips 49 and 74, and the black and white (B&W) shown as clip 41 in a bottommost layer before video clip 0, for processing the image data as black and white.

Figure 2:
FIG. 2 is a pictorial view of an example of a visual presentation for an embodiment of the invention providing multiple monitors.

Multiple monitors can be provided to a user on a video display as shown in FIG. 2. Layer 28 provides a "Crop" function connected via a shuttle bar 30 through layer underlying layers to image clip 210. Image clip 38 in layer 34 is provided as a background for a desired foreground image clip 210 in layer 36, aligned as shown by a user, in this example. The shuttle bar 30 includes a head 31 at one end, and a tail 33 at its other end. For a particular shuttle bar 30, it may itself be considered a form of monitor in that the clips captured or residing between its head 31 and tail 33 are displayed, as shown, via a separate window. The displayed information is presented in successive order by the first layer to the last layer information proceeding from head 31 to tail 33. For any layers that are empty, a video bar such as bar 32 will appear. For each layer associated with a shuttle bar 30 a particular editing function, such as "CROP" 28 may be shown, as in this example, in addition to layers including image and/or sound clips, or perhaps other editing functions. Note that the first layer including a clip of interest, and following layers are considered in the editing process, with video bars 32 not being considered. The monitor 39 provides an enlargement of the combined images, whereas monitor 40 provides a full view of the combined images of clips 38 and 210.

Figure 3A:
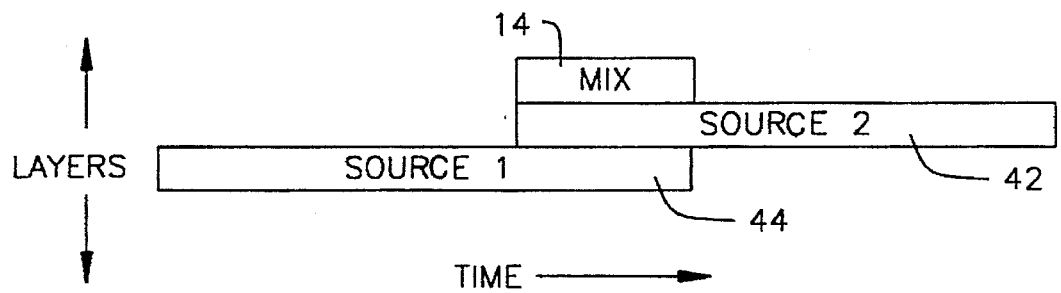
FIG. 3A is a pictorial view of an example of a visual presentation for an embodiment of the invention for grouping of an editing sequence preliminary to further editing.
Figure 3B:
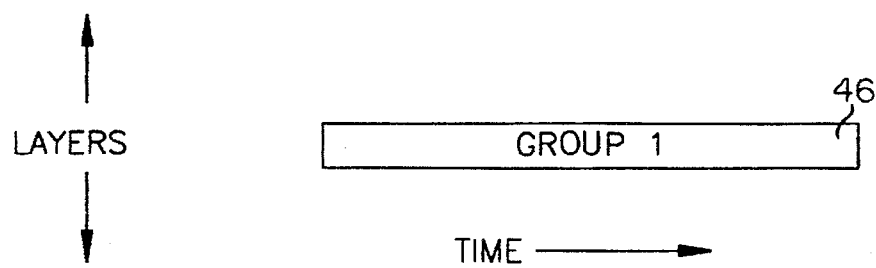
FIG. 3B is a pictorial view of an example of a visual presentation showing the result of the grouping steps associated with FIG. 3A.
Figure 3C:
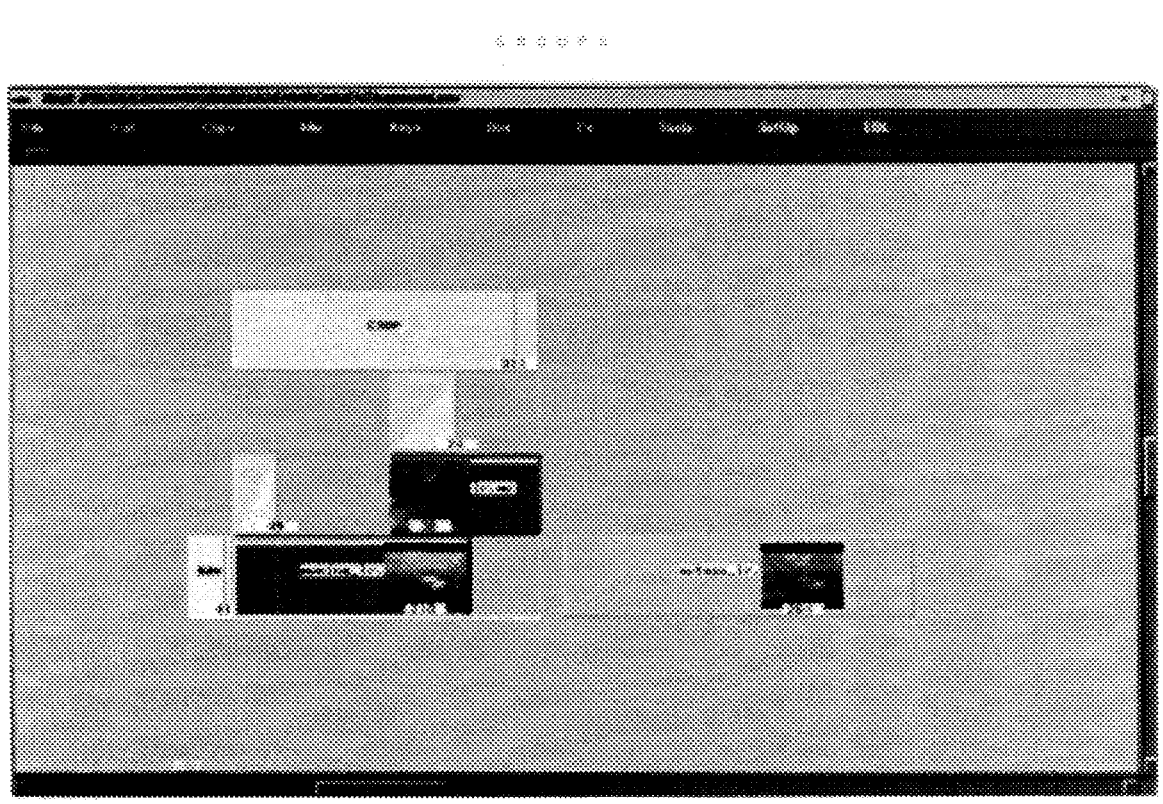
FIG. 3C is a pictorial view of another example of visual presentations showing grouping sequences in one portion, and the result of grouping in another portion.

In FIG. 3A an example of grouping provided by an editing sequence is shown. By using a mixing step 14 in conjunction with the overlayed images 42 and 44, for "Source 2" and "Source 1", respectively, a new clip 46 for "Group 1" is obtained as shown in FIG. 3B. The effect of this, as would be presented on a video display to a user is shown in FIG. 3C. More particularly, the result of combining clip 38 as a background for clip 210 to obtain the combined images shown as clip 264, as illustrated. In this manner, a user can very quickly set up the editing functions to be performed, and is immediately able to see the result obtained at any given time. Obviously, this permits immediate further editing for either further altering a given composition, or for restoring some previous deleted or altered portion, as desired.

Figure 4A:
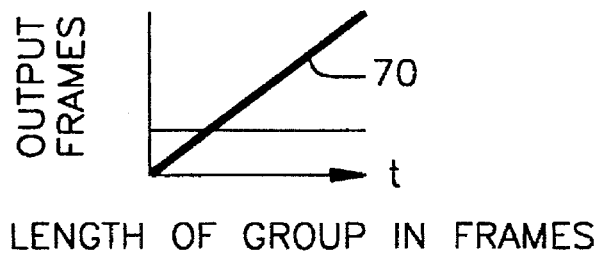
FIG. 4A shows a curve of output frame versus length of group in frames as a function of time, for an interpolation step.
Figure 4B:
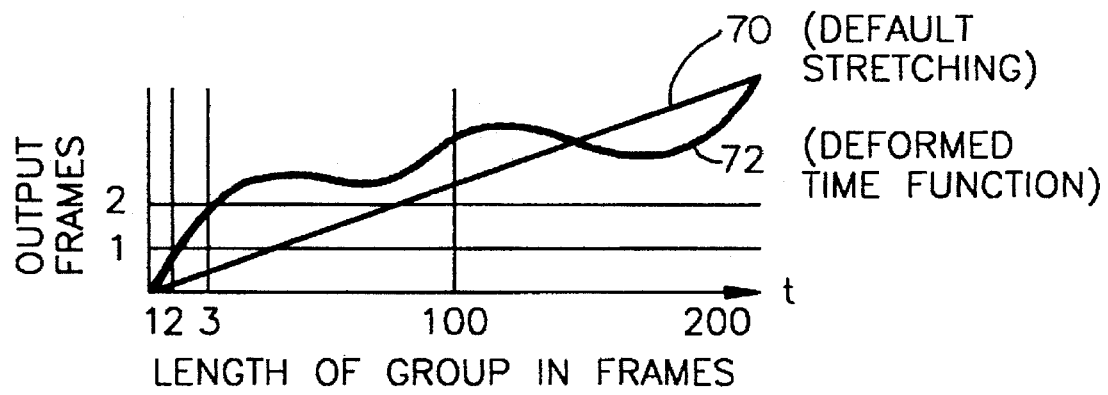
FIG. 4B shows a curve that is altered over time to control the point in time when a frame is to be viewed relative to a successive group of frames including the former, in which the curve shown in FIG. 4A is altered in the example shown to stretch the frames in the group over time (in the curve shown the frame group is stretched to twice its original length, or made to occur over a period of time twice that of the unedited group).
Figure 4C:
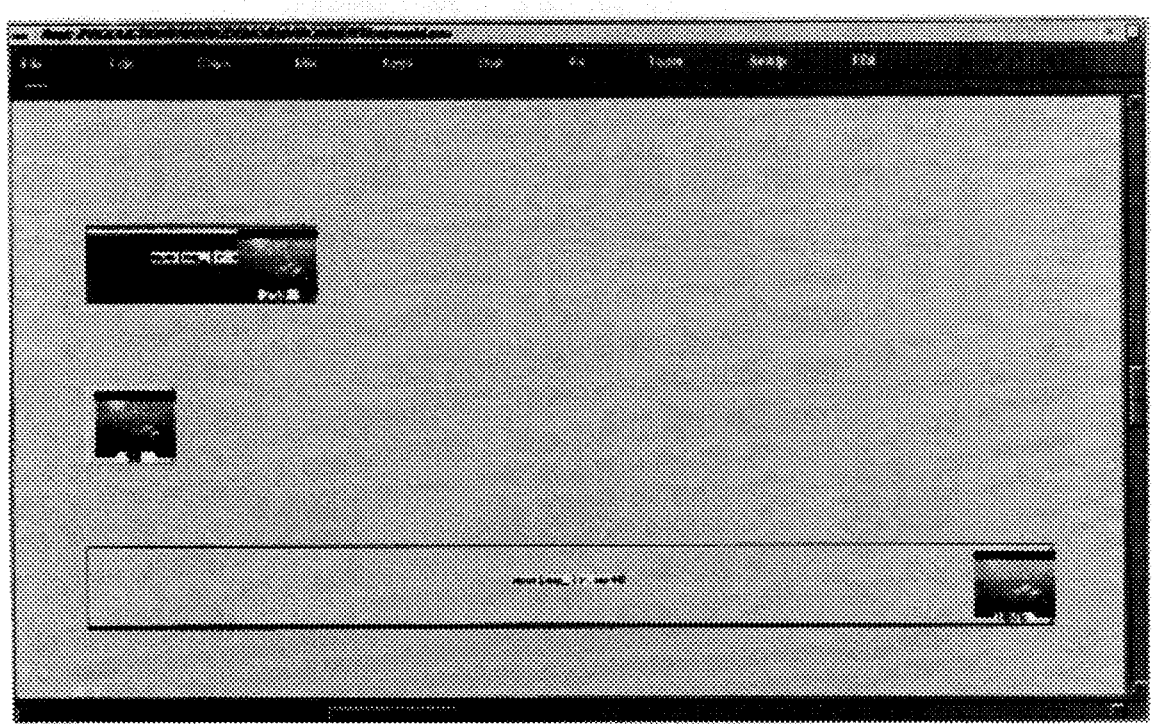
FIG. 4C shows a pictorial view on a video monitor representing interpolation steps, such as shown in the curves of FIG. 4B, for stretching or delaying the time of occurrence of a particular frame of a video image.

The present system, in one embodiment, provides an interpolation function, for permitting a user to control the time presentation for any particular frame. For example, for any given group of clips of images, the group itself has a time parameter that can be visually presented on a video display, for example, as shown in FIG. 4A. A user can control the time at which a frame is delivered for presentation, and the termination time of presentation, by altering over time the curve 70 shown in FIG. 4A to appear as curve 72 (deformed time function) shown in FIG. 4B. This interpolation function is also illustrated in the example of FIG. 4C, in which clips 259 and 98 are stretched to provide clip 1076. By using interpolation, the interval of a clip can be stretched. If a particular clip to be stretched does not include a sufficient number of frames for filling the time period over which the clip is to be presented, in one embodiment of the invention the last frame in the clip is repeated until the end of the time interval period.

As shown above, a reel window provides the central workplace for editing, as viewed on a video display, in this example. For producing a scene sequence the clips are arranged by a user sequentially in the reel. Also, as shown above, the clips can be stacked vertically for creating complex layering. Also, as shown above, effect clips are provided for inclusion in clip layers as system inputs to provide particular editing functions for underlying video clips. As illustrated in the appendix hereto, fades and wipes, 2D and 3D DVE effects, a range of different keying functions, including chroma keys, and imaging processing filters and rotoscoping paint capabilities are provided. These effects can be animated over time. Raw clips can be incorporated into other clips for providing particular effects, and the clips produced as an output from one editing cycle can also be utilized as input clips for obtaining other effects. Preprocessing trees of clips can be altered at will. Real time presentation of the reel can be provided. Subsequent to editing, the resulting sequence of clips and effects can easily be stored on an appropriate storage medium for later presentation.

Figure 5:
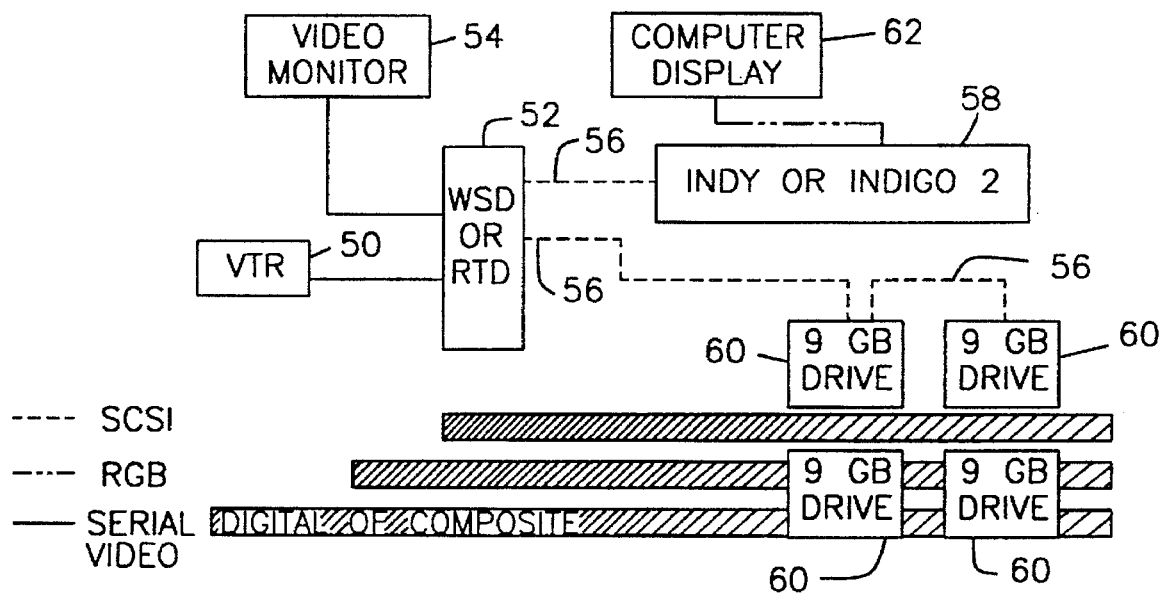
FIG. 5 shows a block schematic diagram of one example of a hardware system capable of being programmed to provide the method of the present invention.
Figure 6:
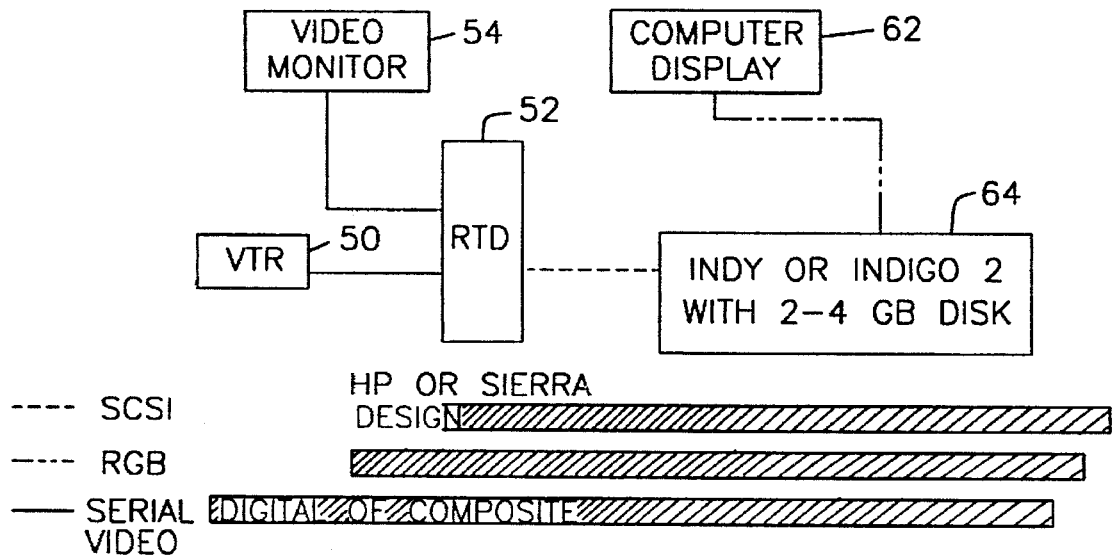
FIG. 6 shows a block schematic diagram of another example of a hardware system capable of being programmed to provide the method of the present invention.

The hardware requirements for providing the editing methodology of the present invention can be provided in many different configurations. FIGS. 5 and 6 illustrate two such configurations. Each include a video tape recorder (VTR) 50 for storing the video images to be edited, in this example. The VTR 50 may also provide images that have been transferred from film to the VTR 50 through use of known film to video equipment. The VTR 50 may also be provided in the alternative by any other source of video images, such as a CD ROM, a floppy disk memory system, a hard drive memory system, direct film-to-video conversion equipment, and so forth. In one configuration the VTR 50 was provided by a Hewlett Packard® model HP 4:2:2 Video Disk Recorder. The output of the VTR 50 is provided as an input to a real time display (RTD) 52 as serial digital or composite video data. The RTD 52 drives a video monitor 54 for viewing associated video images. The RTD 52 is connected via a small computer system interfaces (SCSI) 56 to a microprocessor or desktop workstation 58. In this example, workstation 58 is either an Indy™ Indigo 2™, manufactured by Silicon Graphics Computer Systems. Also, the RTD 52 is connected via SCSI 56 to 9 GB Drives 60. The drives 60 store necessary computer programs for operating the hardware configuration to provide the method of the invention. Also, an RGB connection is made from microprocessor 58 to a computer display 62. The computer display 62 provides a presentation of the image formats, multimedia utilities (icons, for example), menus, directories, subdirectories, visual operating formats, and so forth, accessible to a user via the microprocessor 58. The hardware configuration of FIG. 6 is substantially the same of that of FIG. 5, except that the external hard disk drives 60 are provided by 2–4 GB disk drives internal to the microprocessor 64, as shown.

The system and operating scheme for the present invention is presently known commercially as "Jaleo Composite". The system is described in detail in "Jaleo Composite Reference Manual", (Preliminary Edition), of CHYRON Corporation, Melville, N.Y., dated December, 1994, under Publ. No. 2A01879. Note that the Manual is also associated with Comunicacion Integral, Madrid Spain. The teachings of this Manual are incorporated herein by reference in entirety. A copy of this Manual is included herewith in an Appendix to the file hereto.

As shown in the Manual the present invention is provided as a single platform. The programming and other aspects of the invention, as given in detail in the Manual, will now be summarized. The system operates internally with .vst format images. The various editing tasks provided in the system are primarily processed as images. For example, in FIG. 3C, a "CROP" clip 311 is provided as an image on the display for selectively cropping the video clips 38 and 210 positioned as shown for overlaying clip 210 onto the image of clip 38 (also see FIG. 2). The resultant image is shown as video clip 264.

In this example, for the system to be compatible with the Indy™/Indigo™ hardware of Silicon Graphics, the sound files must be in non-compressed .AIFF code, with 2 bytes per sampling. The audio signals can be either in monaural or stereo.

A window multiarea environment is provided in the system for permitting visual observation of the movement of various video, sound, and operating clips during the editing process scaling, time stretching, compositing, masking, cropping, image overlaying, image extraction, and so forth, can all be performed via visual observation by a user. A variety of icons, as shown on pages 2–4 and 2–5 of the Manual are utilized to provide efficient and time saving interfaces with a user.

As described in "Chapter 3" of the Manual, an editing process is initiated by users first naming a project through use of a "Projects" utility. The system then stores the information in subdirectories associated with the particular project, in accordance with the work task to be carried out. For example, sound clips are stored in a subdirectory "CLIP-SOUND". A "PAINT" subdirectory stores files related to the available palette, for such functions as masking, coloring, and so forth.

Also enclosed herewith for inclusion in an Appendix for this case file is a brochure entitled "Jaleo Digital Post Production System" of CHYRON Corporation, Melville, N.Y., and Comunicacion Integral, Madrid Spain. The teachings of this brochure are incorporated herein by reference in their entirety.

Although various embodiments of the invention are shown and described herein, they are not meant to be limiting. Those of skill in the art may recognize certain modifications to these embodiments, which modifications are meant to be covered by the spirit and scope of the appended claims.

What is claimed is:

1. A method for editing video and associated audio data derived from film of video images, comprising the steps of:

forming said video data into a plurality of video clips;

uniquely identifying each one of said plurality of video clips;

displaying on a video display the ones of said plurality of video clips that occur over a given period of time relative to one another in the time domain;

arranging said plurality of video clips associated with a given frame of video into a vertical stacks, with each clip being positioned in a layer its associated stack in a hierarchy from background to foreground at the time of occurrence of the associated frames;

selectively rearranging the positioning of video clips within a stack to obtain a desired effect; and moving said video clips between stacks, to obtain a desired effect for successive frames of video.

2. The method of claim 1, further comprising the steps of:

forming said audio data into a plurality of audio clips;

uniquely identifying each one of said plurality of audio clips;

displaying on said video display said plurality of audio clips in vertical alignment with the stacks of associated video clips; and selectively moving said audio clips from one video stack of video clips to another to obtain a desired audio effect for successive frames of video.

3. The method of claim 1, further comprising the step of:

selectively adjusting the length of time for the period of occurrence each one of said vertical stacks of video clips, for obtaining a desired effect.

4. The method of claim 1, further including the step of:

arranging said vertical stacks of video clips in a successive order for obtaining a desired effect.

5. The method of claim 1, further including the steps of:

forming a vertically oriented cursor relative to the vertical stacks of video clips;

displaying said cursor on said video display;

providing for the selective movement of said cursor in time or horizontally on said display to a position intercepting a desired stack of said plurality of video clips;

providing for the selective movement of said cursor in the vertical direction on said video display; and providing for the selective adjustment of the height of said cursor to be the height of one or more said video clips.

6. The method of claim 5, wherein said rearranging step further includes the steps of:

moving said cursor to the position of a desired one of said stacks of video clips on said video display;

adjusting the height or vertical width of said cursor to intercept either a desired one of or a successively stacked plurality of said video clips in the associated stack of video clips;

adjusting the vertical positioning of said cursor relative to the associated said stack for capturing either the desired one or successively stacked ones of said video clips of said stack to be rearranged; and moving said cursor along with its captured video clip or clips to the new position desired in either the associated said stacks or to a desired position in another one of said stacks.

7. The method of claim 2, further including the steps of:

forming a vertically oriented cursor relative to the vertical stacks of audio and video clips;

displaying said cursor on said video display;

providing for the selective movement of said cursor in time or horizontally on said display to a position intercepting a desired stack of said plurality of video clips;

providing for the selective movement of said cursor in the vertical direction on said video display; and providing for the selective adjustment of the height of said cursor to be the height of one or more said video and/or audio clips.

8. The method of claim 7, wherein said rearranging step further includes the steps of:

moving said cursor to the position of a desired one of said stacks of said video clips on said video display;

adjusting the height or vertical width of said cursor to intercept either a desired one of or a successively stacked plurality of said video clips in the associated stack of video clips;

adjusting the vertical positioning of said cursor relative to the associated said stack for capturing either the desired one or successively stacked ones of said video clips of said stack to be rearranged; and moving said cursor along with its captured video clip or clips to the new position desired in either the associated said stacks or to a desired position in another one of said stacks.

9. The method of claim 8, wherein said rearranging step further includes the steps of:

moving said cursor to the position of a desired one of said stacks of video and audio clips;

adjusting the height of said cursor to that of an audio clip;

changing the vertical position of said cursor to that of an audio clip associated with the video stacks for capturing the audio clip; and moving said cursor along with its captured audio clip to a desired another one of said stacks of video clips for changing the time of occurrence of said audio clip.

10. The method of claim 9, wherein said rearranging step further includes the steps of:

selectively eliminating various ones of said video clips captured by said cursor; and selectively eliminating various ones of said audio clips captured by said cursor.

11. The method of claim 1, further including the step of selectively changing the time of occurrence of at least one of said vertical stacks of video clips, for obtaining a desired effect.

12. The method of claim 2, further including the step of providing clips showing editing functions being performed in association with said stack of video and/or audio data being displayed.

* * * * *